Feb. 21, 1961     O. W. SEPP, JR     2,972,458
PARACHUTE CANOPY EJECTION AND OPENING APPARATUS
Filed April 11, 1958     2 Sheets-Sheet 1
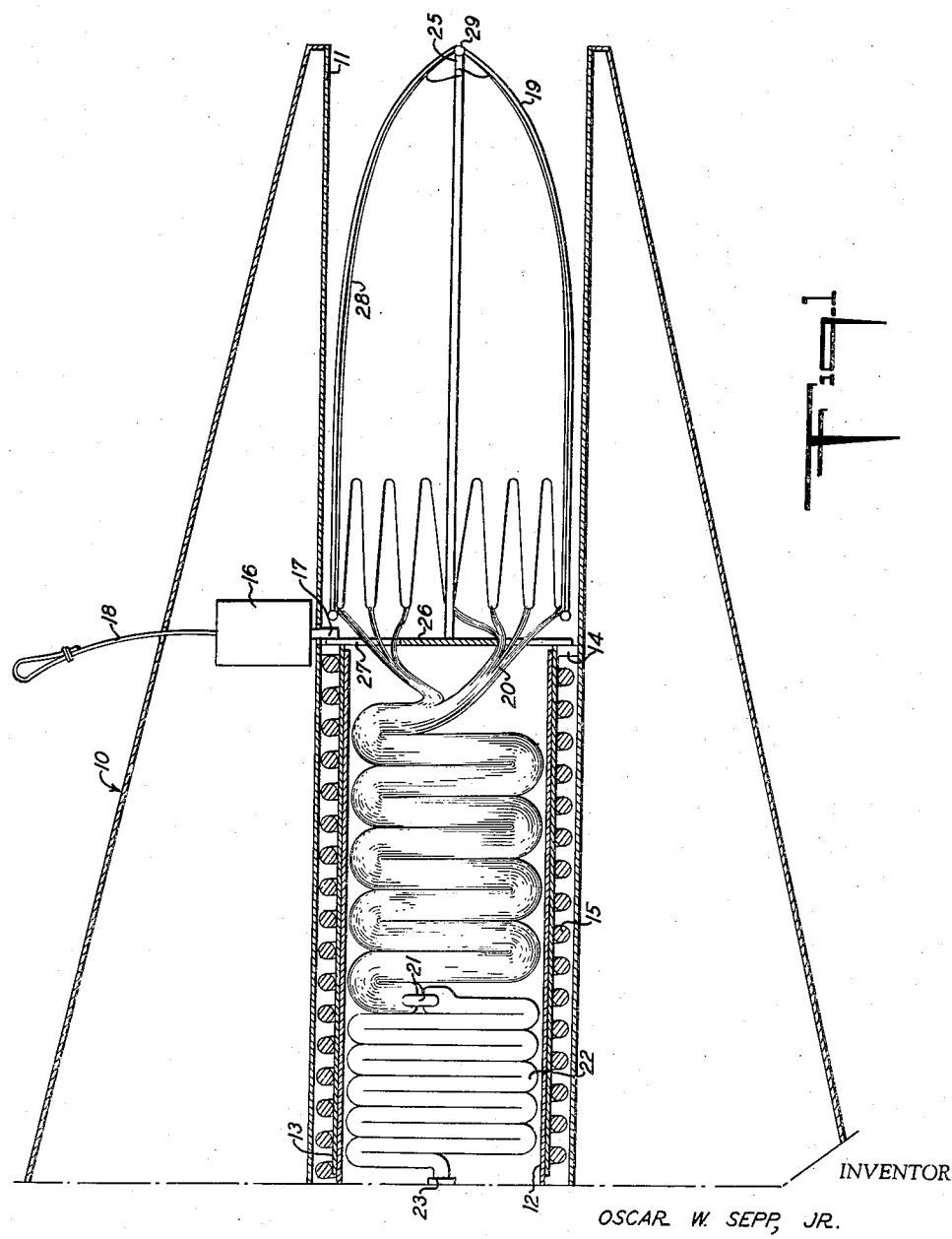
INVENTOR
OSCAR W. SEPP, JR.
BY
ATTORNEYS

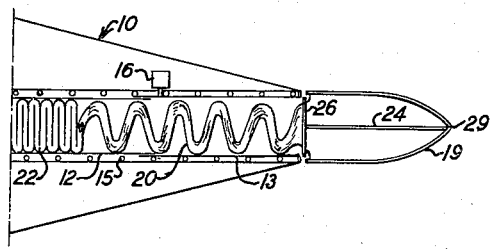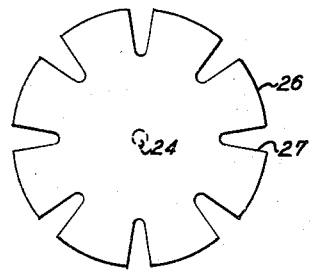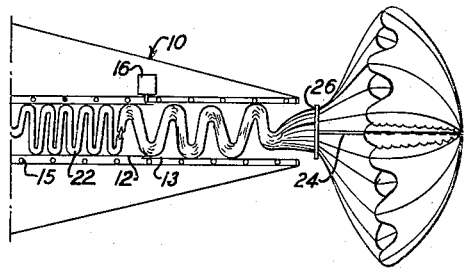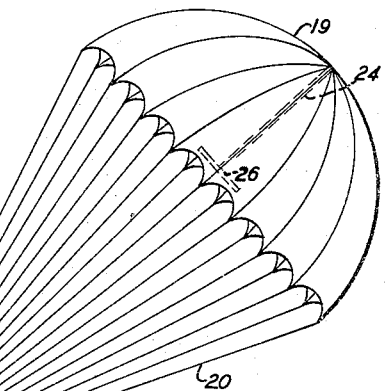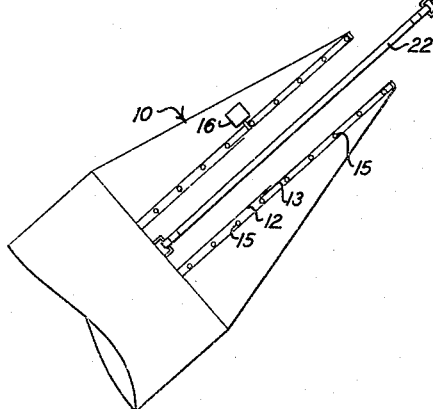

United States Patent Office 2,972,458
Patented Feb. 21, 1961

2,972,458

PARACHUTE CANOPY EJECTION AND OPENING APPARATUS

Oscar W. Sepp, Jr., Dayton, Ohio, assignor to M. Steinthal & Co., Inc., New York, N.Y., a corporation of New York Filed Apr. 11, 1958, Ser. No. 727,863

5 Claims. (Cl. 244—147)

This invention relates to aeronautics and more particularly to an apparatus for ejecting a parachute canopy from an airborne vehicle and for opening such canopy to facilitate inflation thereof.

It has become relatively common practice to utilize decelerating devices, in the form of parachutes, in connection with airborne vehicles, such as aircraft, missiles, fuel tanks and other airborne equipment and in the use of such decelerating devices it is essential that the same be ejected from the vehicle and inflated in an extremely short period of time. In many instances, it has been customary to employ a pilot chute which is ejected by spring or other means and upon inflation of such pilot chute, the same operates to withdraw and deploy a main parachute of considerably larger dimensions. Such a system requires appreciable time for complete deployment and inflation and furthermore, occupies considerable space in the airborne vehicle when packed therein. Furthermore, the repacking of such a decelerating system requires considerable time and the services of highly skilled personnel and consequently, any apparatus which will operate to provide rapid ejection, deployment and inflation of a parachute decelerating system and at the same time, facilitate repacking of the same for future operations represents a material advancement in the art.

It is accordingly an object of the invention to provide a parachute canopy ejection and opening apparatus which may be conveniently and economically constructed from readily available materials and which may be conveniently installed in various types of airborne vehicles.

A further object of the invention is the provision of a parachute canopy ejection and opening apparatus which consists of relatively few moving parts and which may be designed to occupy a minimum of space in the airborne vehicle to which the same is applied.

A still further object of the invention is the provision of a parachute canopy ejection and opening apparatus which may be utilized to eject and deploy a parachute decelerating system without the necessity of utilizing a pilot chute.

Another object of the invention is the provision of a parachute canopy ejection and opening apparatus which may be conveniently utilized in connection with a pilot chute which after ejection and inflation, operates to withdraw a main parachute.

A further object of the invention is the provision of a parachute canopy ejection and opening apparatus, the operation of which may be controlled by a time delay mechanism thereby providing for ejection, deployment and inflation after a specified period of time.

A still further object of the invention is the provision of a parachute canopy ejection and opening apparatus in which the ejection forces are applied to the parachute through a relatively rigid mechanical system thereby substantially preventing loss of energy and possible failure of the ejection apparatus.

Another object of the invention is the provision of a parachute canopy ejection and opening apparatus which serves to positively eject a parachute canopy from an airborne vehicle and to open the same to facilitate inflation and at the same time, in no way interferes with the normal operation of the parachute.

Further objects and advantages of the invention will be apparent from the following description taken in conjunction with the accompanying drawing wherein:

Fig. 1 is a longitudinal sectional view of the after end of an airborne vehicle and showing the structure of a parachute canopy ejection and opening apparatus constructed in accordance with this invention and with the canopy stowed in place preparatory to ejection thereof from the vehicle;

Fig. 2 a diagrammatic view showing the position occupied by the parachute canopy immediately after operation of the ejection apparatus and prior to opening of the canopy by the opening apparatus;

Fig. 3 a diagrammatic view similar to Fig. 2, but showing the parachute canopy in open condition as a result of the operation of the opening apparatus and prior to full inflation thereof;

Fig. 4 a diagrammatic view showing a parachute in fully inflated condition as the result of the operation of the ejection and opening apparatus of this invention; and Fig. 5 an end elevational view of a disk utilized to transmit ejection forces to the parachute canopy and to provide for passage of the shroud lines connected to such canopy.

With continued reference to the drawing, there is shown in Fig. 1 a parachute canopy ejection and opening apparatus constructed in accordance with this invention and which may well be installed in the after end of an airborne vehicle, such as a missile 10 provided with a tubular compartment 11 open at the after end and designed to receive and house a parachute canopy, together with the associated ejection and opening apparatus.

As shown in Fig. 1, a tubular housing 12 is secured at the inner end to the vehicle 10 with the after end of the housing 12 open and slidably received on the housing 12 for sliding movement with respect thereto is a guide sleeve 13. Fixed to the outer end of guide sleeve 13 is an ejection ring 14 and disposed between the ring 14 and a fixed part of the vehicle 10 is a compression spring 15, the inner end of which is fixed against movement and the outer end engaging the ring 14.

A time delay mechanism 16 of any suitable character and which may consist of clockwork, pneumatic or hydraulic time delay mechanism or may consist of an electrically operated mechanism to actuate a trigger 17, the purpose and operation of which will be presently described. Also attached to the time delay mechanism 16 is an arming lanyard 18 which may be utilized in any desired manner to set the time delay mechanism 16 in operation. One manner of utilizing the lanyard 18 would be to attach the same to an aircraft by a frangible connection which upon release of the vehicle 10 from the aircraft would operate to pull the lanyard 18 thereby initiating operation of the time delay mechanism 16 and the frangible connection would thereafter break in order to release the vehicle 10 for free flight until such time as the time delay mechanism 16 actuated the trigger 17 to release a decelerating parachute system in a manner to be presently described.

A conventional parachute canopy 19 may be provided with shroud lines 20 secured to the skirt of the canopy 19 at spaced points and such shroud lines 20 are in turn secured by a suitable connector 21 to a bridle 22 which in turn is connected at the inner end 23 to a fixed part of the airborne vehicle 10. A substantially rigid ejection rod 24 is secured at the outer end 25 to the apex of the canopy 19 and the rod 24 projects inwardly and axially thereof and is provided at the inner end with a disk 26 fixed thereto. As best shown in Fig. 5, the disk 26 is provided with a plurality of angularly spaced radial slots 27, the purpose of which will presently appear.

Also incorporated in the canopy 19 is an opening apparatus which may take the form of a plurality of generally radially disposed spring arms or bows 28 pivotally connected at 29 adjacent the apex of the canopy 19 and extending radially and secured to the canopy 19 much in the nature of the ribs of an umbrella.

While one form of opening apparatus is shown and described, such apparatus may if desired, take the form of that disclosed and claimed in my co-pending application, Serial No. 727,849, filed April 11, 1958, and which also operates to open the parachute canopy to facilitate inflation thereof.

As best shown in Fig. 1, the decelerating parachute system may be stowed in the compartment 11 of the airborne vehicle 10 with the bridle 22 and shroud lines 20 in folded condition and received in the tubular housing 12 and it is to be noted, that groups of the shroud lines 20 extend through the radial slots 27 in the disk 26. The parachute canopy 19 is collapsed and inserted in the compartment 11 and the wall thereof serves to retain the spring arms 28 forming the opening apparatus in collapsed condition and it is to be noted that the canopy 19 is retained in the compartment 11 by disposing the disk 26 in engagement with the ejection ring 14 and with the trigger 17 of the time delay mechanism 16 engaging the outer surface of the disk 26 to securely hold the same in place with the sleeve 13 in telescoping relationship to the housing 12 and with the spring 15 in compressed condition.

Upon release of the airborne vehicle 10 from an aircraft or the like, the lanyard 18 will be operated to initiate operation of the time delay mechanism 16 and upon expiration of the time period for which the mechanism 16 is preset, the trigger 17 will be actuated to release the disk 26 and ejection ring 14 whereupon the compression spring 15 will operate to forcibly move the ejection ring 17 and sleeve 13 outwardly of the tubular housing 12 and the force exerted by the spring 15 will be transmitted through the ejection ring 14, the disk 26 and the ejection rod 24 to the apex of the canopy 19 thereby forcibly ejecting the same from the compartment 11 in the airborne vehicle 10 at which time the canopy 19, shroud lines 20 and bridle 22, as well as the ejection ring 14 and sleeve 13 will occupy the positions shown in Fig. 2.

Immediately upon release of the canopy 19 from the compartment 11, the arms 28 will spring outwardly to open the canopy 19 to the condition shown in Fig. 3, thereby permitting air to enter the same and cause immediate and full inflation to the condition clearly shown in Fig. 4. During inflation of the canopy, the shroud lines 20 will, of course, pass outwardly of the radial slots 27 in the disk 26 and the fouling of such shroud lines during opening and inflation of the canopy 19 is prevented by the grouping of the same in the radial slots 27 of the disk 26. The canopy 19 will then operate in the usual manner to provide a decelerating force and lower the vehicle 10 to the ground at a predetermined speed of descent in accordance with the design of the decelerating parachute system.

While the parachute ejection and opening apparatus of this invention has been described in connection with a single parachute, obviously the same may be utilized in connection with a pilot chute which in turn will withdraw a main chute of larger dimensions from the compartment in the vehicle, but the operation of the ejection and opening apparatus would be the same in either case.

When it is desired to repack the decelerating parachute system in the vehicle for further use, it is only necessary to fold the arms 28 a sufficient distance to permit insertion of the canopy 19 within the compartment 11 and at the same time, the spring 15 is compressed by movement of the ejection ring 14 and sleeve 13 inwardly until such time as the disk 26 may be engaged by the trigger 17 to retain the same in position, as shown in Fig. 1.

It will be seen that by the above described invention there has been provided a relatively simple, yet highly effective parachute ejection and opening apparatus and obviously the same may be installed in many different types of airborne vehicles and will operate to provide a suitable parachute decelerating system which may be deployed and inflated to full operative size in a minimum of time. Furthermore, the apparatus is extremely simple thereby reducing maintenance costs and problems and at the same time, materially contributing to trouble free and positive operation.

It will be obvious to those skilled in the art that various changes may be made in the invention without departing from the spirit and scope thereof and therefore the invention is not limited to that which is shown in the drawings and described in the specification, but only as indicated in the appended claims.

What is claimed is:

1. A parachute canopy ejection and inflation apparatus comprising in combination a parachute including a canopy, shroud lines secured to the canopy and a bridle connected to the shroud lines, a tubular housing to be secured at the inner end to an airborne vehicle and for receiving said bridle and shroud lines, a guide sleeve slidably mounted on said housing for sliding movement with respect thereto, an ejection ring fixed to said sleeve at the outer end, a compression spring surrounding said sleeve, one end of said spring being immovable and the opposite end engaging said ring to urge said ring and sleeve outwardly of said housing, a trigger releasably engaging said ring to hold said sleeve in telescoping relationship with said housing and said spring in compressed condition, automatic time delay mechanism for actuating said trigger to release the same and permit outward movement of said ring and sleeve with respect to said housing, an ejection rod fixed at the outer end to the apex of said canopy, a disk fixed to the inner end of said rod and engaging said ring and trigger, radial slots in said disk for receiving said shroud lines when said canopy is in collapsed condition and spring actuated opening means attached to said canopy whereby upon release of said trigger said canopy will be ejected from said vehicle by the engagement of said ring with said disk and said opening means will operate to open said canopy and facilitate inflation thereof.

2. A parachute canopy ejection and inflation apparatus comprising in combination a parachute including a canopy, shroud lines secured to the canopy and a bridle connected to the shroud lines, a tubular housing to be secured at the inner end to an airborne vehicle and for receiving said bridle and shroud lines, a guide sleeve slidably mounted on said housing for sliding movement with respect thereto, an ejection ring fixed to said sleeve at the outer end, a compression spring surrounding said sleeve, one end of said spring being immovable and the opposite end engaging said ring to urge said ring and sleeve outwardly of said housing, a trigger releasably engaging said ring to hold said sleeve in telescoping relationship with said housing and said spring in compressed condition, mechanism for actuating said trigger to release the same and permit outward movement of said ring and sleeve with respect to said housing, an ejection rod fixed at the outer end to the apex of said canopy, a disk fixed to the inner end of said rod and engaging said ring and trigger, radial slots in said disk for receiving said shroud lines when said canopy is in collapsed condition, and spring actuated opening means attached to said canopy whereby upon release of said trigger said canopy will be ejected from said vehicle by the engagement of said ring with said disk and said opening means will operate to open said canopy and facilitate inflation thereof.

3. A parachute canopy ejection and inflation apparatus comprising in combination a parachute including a canopy, shroud lines secured to the canopy and a bridle connected to the shroud lines, a tubular housing to be secured at the inner end to an airborne vehicle and for receiving said bridle and shroud lines, a guide sleeve slidably mounted on said housing for sliding movement with respect thereto, an ejection ring fixed to said sleeve at the outer end, a compression spring surrounding said sleeve, one end of said spring being immovable and the opposite end engaging said ring to urge said ring and sleeve outwardly of said housing, a trigger releasably engaging said ring to hold said sleeve in telescoping relationship with said housing and said spring in compressed condition, mechanism for actuating said trigger to release the same and permit outward movement of said ring and sleeve with respect to said housing, an ejection rod fixed at the outer end to the apex of said canopy, a disk having slots receiving said shroud lines, said disk fixed to the inner end of said rod and engaging said ring and trigger and spring actuated opening means attached to said canopy whereby upon release of said trigger said canopy will be ejected from said vehicle by the engagement of said ring with said disk and said opening means will operate to open said canopy and facilitate inflation thereof.

4. A parachute canopy ejection and inflation apparatus comprising in combination a parachute including a canopy, shroud lines secured to the canopy and a bridle connected to the shroud lines, a tubular housing to be secured at the inner end to an airborne vehicle and for receiving said bridle and shroud lines, a guide sleeve slidably mounted on said housing for sliding movement with respect thereto, an ejection ring fixed to said sleeve at the outer end, a compression spring surrounding said sleeve, one end of said spring being immovable and the opposite end engaging said ring to urge said ring and sleeve outwardly of said housing, releasable means engaging said ring to hold said sleeve in telescoping relationship with said housing and said spring in compressed condition, an ejection rod fixed at the outer end to said canopy, a disk having slots receiving said shroud lines, said disk fixed to the inner end of said rod and engaging said ring and spring actuated opening means attached to said canopy whereby upon actuation of said releasable mean said canopy will be ejected from said vehicle by the engagement of said ring with said disk and said opening means will operate to open said canopy and facilitate inflation thereof.

5. A parachute canopy ejection and inflation apparatus comprising in combination a parachute including a canopy, shroud lines secured to the canopy and a bridle connected to the shroud lines, a tubular housing to be secured at the inner end to an airborne vehicle and for receiving said bridle and shroud lines, a guide sleeve slidably mounted for movement with respect to said housing, an ejection ring fixed to said sleeve at the outer end, resilient means engaging said ring to urge said ring and sleeve outwardly of said housing, releasable means engaging said ring to hold said sleeve in telescoping relationship with said housing, an ejection rod fixed at the outer end to said canopy, a disk having slots receiving said shroud lines, said disk fixed to the inner end of said rod and engaging said ring and spring actuated opening means attached to said canopy whereby upon actuation of said releasable means said canopy will be ejected from said vehicle by the engagement of said ring with said disk and said opening means will operate to open said canopy and facilitate inflation thereof.

References Cited in the file of this patent

UNITED STATES PATENTS

| | | |
|---|---|---|
| 1,067,559 | Steinmetz | July 15, 1913 |
| 1,072,764 | Nagel | Sept. 9, 1913 |
| 1,138,140 | Oister | May 4, 1915 |
| 1,277,892 | Evans | Sept. 3, 1918 |
| 1,730,927 | Fixel | Oct. 8, 1929 |
| 2,502,470 | Martin | Apr. 4, 1950 |
| 2,513,867 | Heffernan | July 4, 1950 |
| 2,673,051 | Frost | Mar. 23, 1954 |
| 2,729,408 | Quilter | Jan. 3, 1956 |